J. O. MORRIS.
TRACK FOR VEHICLES.
APPLICATION FILED FEB. 7, 1912.
1,142,195.
Patented June 8, 1915.
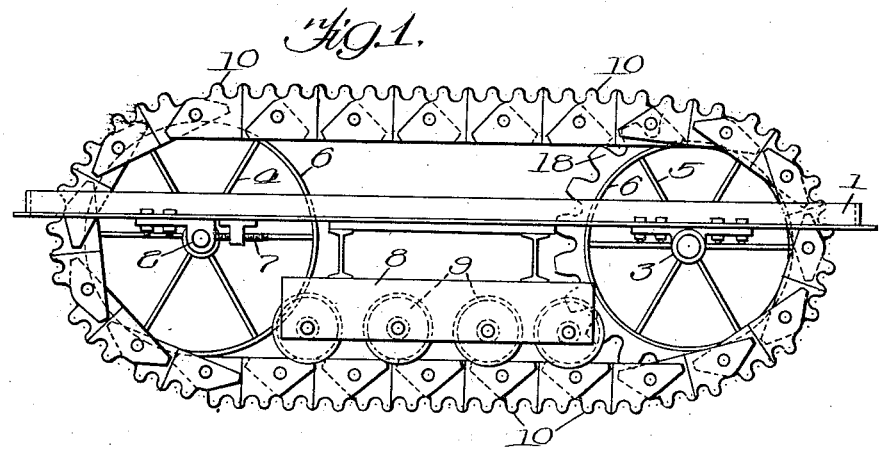
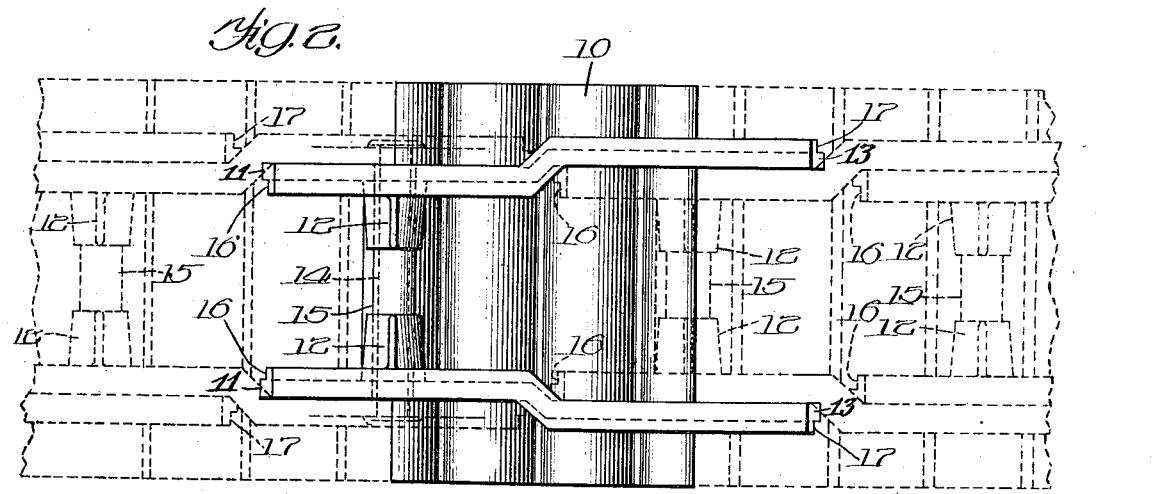
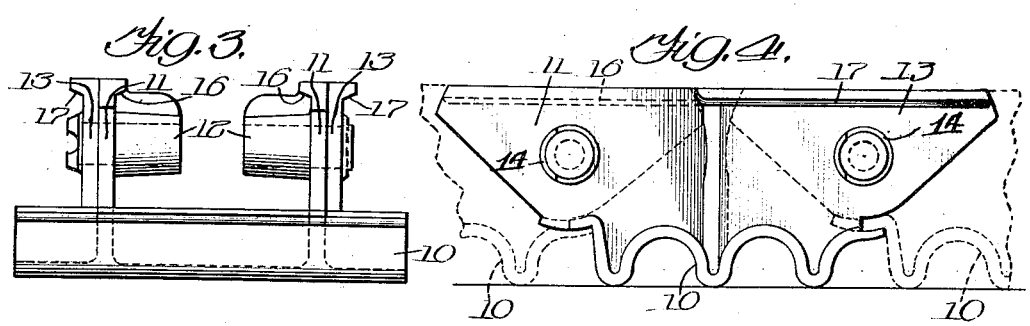
Witnesses:
Jno. H. Nelson Jr.
Edwin B. Wilson
Inventor:
John O. Morris.
By G. L. Cragg
Atty.

UNITED STATES PATENT OFFICE.

JOHN O. MORRIS, OF DAVENPORT, IOWA, ASSIGNOR, BY MESNE ASSIGNMENTS, TO BULLOCK TRACTOR COMPANY, OF CHICAGO, ILLINOIS, A CORPORATION OF ILLINOIS.

TRACK FOR VEHICLES.

1,142,195.   Specification of Letters Patent.   Patented June 8, 1915.

Application filed February 7, 1912. Serial No. 676,021.

*To all whom it may concern:*

Be it known that I, JOHN O. MORRIS, citizen of the United States, residing at Davenport, in the county of Scott and State of Iowa, have invented a certain new and useful Improvement in Track for Vehicles, of which the following is a full, clear, concise, and exact description, reference being had to the accompanying drawings, forming a part of this specification.

My invention relates to endless tracks that are carried by and are provided for vehicles, such tracks being in the form of endless chains which travel in chain orbits, as is well understood by those skilled in the art. Carrying wheels bear upon the upper sides of portions of the chains that rest upon the ground, these upper sides affording tread surfaces for carrying wheels. Hitherto these tread surfaces terminated at the vertical lines passing through the chain pins at the ends of the chain stretches that were on the ground.

It is one object of my invention to increase the length of the carrying wheel tread surfaces that are afforded by the tracks and I accomplish this object by continuing the tread portions of certain of the chain links, and preferably the tread portions of all of the chain links, beyond the pins by which the chain links are joined.

My invention has for another of its objects an improved construction of the links of an endless chain track, this second object of my invention being realized in a chain link whose ground engaging portion is formed in the same integral casting with side flanges, through which flanges the link joining pins are passed.

I will explain my invention more fully by reference to the accompanying drawing showing the preferred embodiment thereof and in which—

Figure 1 is a side view of a portion of a vehicle equipped with a track constructed in accordance with my invention; Fig. 2 is a plan view of several links of a chain, one link being shown by full lines and adjoining links being shown by dotted lines; Fig. 3 is an end view of one of the links shown in Fig. 2; and Fig. 4 is a side view of a part of the structure as it appears in Fig. 2.

Like parts are indicated by similar characters of reference throughout the different figures.

I have shown enough of a vehicle portion to enable the manner in which the chain of my invention may be applied to the vehicle readily to be understood. The vehicle portion shown, to which the invention is not to be limited, includes a truck frame 1 carrying bearings 2 and 3 for the tension and driving sprocket wheels 4 and 5. The wheel 4 is provided with a smooth rim 6 that engages the hollow bushings 15, while the wheel 5 is provided with sprocket teeth that also engage said bushings. Each tension wheel 4 is adapted to have its distance from the corresponding driving sprocket wheel 5 adjustably maintained by a tension device 7 for the purpose of maintaining the endless track belonging to these wheels sufficiently taut. The truck frame 1 is also provided with a carrier 8 in which a plurality of carrying wheels or rollers 9 are mounted, these wheels or rollers being employed for engaging the upper side of the lower stretch of the associate endless track to maintain the portion of the track between the wheels 4 and 5 sufficiently level so as to prevent the track from unduly conforming with irregularities in the surface of the ground over which the vehicle is moving and to limit the extent to which the lower stretches of the track may be upwardly flexed. The major portion of the vehicle load is borne by the carrier wheels for the purpose of securing traction.

The links of the chain composing each track are desirably similar in construction, though I do not wish to be limited to this characteristic. Each link, as preferably constructed, is formed in one integral structure that includes the ground engaging tread portion 10, the vertical flanges 11, and the bosses 12 projecting inwardly from the flanges 11. The flanges 11 are provided with longitudinal continuations 13 that are outwardly and laterally offset with respect to the boss carrying portions 11. The space between the flange portions 13 of each chain link is sufficient snugly to receive the more closely approached flange portions 11 of the next link. Link joining pins 14 are passed through the bosses 12 and alined apertures in the over lapping flange portions 11 and 13 of adjacent links. These pins 14 are desirably surrounded throughout portions of their lengths by means of sleeves or bushings 15. The top surface of the flange portions 11 and 13 of the links in the lower stretch of the chain afford the tread surface for the carrying wheels or rollers 9. The top surfaces of the flange portions 11 are enlarged by providing insetting extensions 16, while the top surfaces of the flange portions 13 are enlarged by providing outsetting extensions 17, whereby the tread surfaces for the wheels or rollers 9 are materially widened.

I have thus provided an endless track for vehicles formed of links each having tread portions formed in lengths that are sufficiently offset, at midlength, with respect to each other to bring similarly positioned offset lengths of the links substantially into alinement, the links adjacent each link terminating at the offset in such link whereby a tread is constituted which is composed substantially throughout the length of the track of tread portions of the links which are located side by side. Hitherto the effective carrying wheel tread surfaces afforded by each link were co-extensive in length with the pitch length of such link, the pitch length of a link being measured by the distance between the axes of the link joining pins passing through such link.

In accordance with my invention the carrying wheel tread surface afforded by links of the chain and preferably by each link of the chain is increased by extending such tread surface beyond the pitch length of each link. The carrying wheel tread surface of each link is thus extended by continuing the flange portions 11 and 13 as illustrated, by which extensions of the flange portions 11 and 13 I effectively increase the length of the chain tread upon which the carrying wheels move and am enabled more effectively and with simpler means to limit the upward bending of the lower stretch of the chain by means of the wheels or rollers 9. Having thus extended the flange portions 11 and 13, I deepen the links (which constitute ground engaging shoes) sufficiently to allow the projected portions of the flanges 11 and 13 properly to move within and without the contiguous chain links or shoes. By reason of the elongated carrying wheel tread surface which I have provided the weave of the endless track under the vehicle load is lessened, particularly in view of the fact that the elongated tread 11 and 13 is sufficiently extended beyond the pitch of the link or shoe of the endless track band to receive two of the multiple carrying wheels or rollers at the same time. The rollers 9 are so positioned that they coöperate with the track engaging rims of the wheels 4 to maintain the lower stretch of the track in a substantially straight line tangential to these rims.

As the invention is illustrated the driving wheel 5 is constituted a sprocket wheel by means of sprocket teeth 18 carried thereby and which sprocket teeth are engaged with the sleeves 15 surrounding the pins and for the purpose of causing the carrying wheels to roll upon the chain as the chain is laid. Any suitable motor element may be employed for turning the driving wheel 5. The four rollers 9 have fixed axes of rotation and engage substantially all of the track underlying the wheels 4 and 5 whereby the track is held properly level properly to guide it from one wheel to the other.

It is usual to equip vehicles of the kind to which my invention relates with two sets of endless chains, one upon each side of the vehicle, and to provide two wheels 4 at the forward portion of the truck 1 and two wheels 5 at the rear portion of such truck, though the invention is obviously not to be limited to the duplication of the structure which I have shown and specifically described.

While I have herein shown and described one embodiment of my invention, I do not wish to be limited to the precise details of construction shown as changes may readily be made without departing from the spirit of my invention.

Having thus described my invention, I claim as new and desire to secure by Letters Patent the following:—

1. An endless track for vehicles formed of links each having tread portions formed in lengths that are sufficiently offset with respect to each other to bring similarly positioned offset lengths of the links substantially into alinement, the links adjacent each link terminating at the offset in such link.

2. An endless track for vehicles formed of links each having tread portions formed in lengths that are sufficiently offset, at midlength, with respect to each other to bring similarly positioned offset lengths of the links substantially into alinement, the links adjacent each link terminating at the offset in such link.

In witness whereof, I hereunto subscribe my name this fifth day of February A. D., 1912.

JOHN O. MORRIS.

Witnesses:
E. L. WHITE,
G. L. CRAGG.